United States Patent
Choi

(10) Patent No.: US 7,619,954 B2
(45) Date of Patent: Nov. 17, 2009

(54) METHOD FOR CONTROLLING SPINDLE IN OPTICAL DISC DEVICE

(75) Inventor: Tae Jin Choi, Osan-si (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 667 days.

(21) Appl. No.: 11/384,284

(22) Filed: Mar. 21, 2006

(65) Prior Publication Data

US 2006/0209650 A1    Sep. 21, 2006

(30) Foreign Application Priority Data

Mar. 21, 2005    (KR)    ........................ 10-2005-0023257

(51) Int. Cl.
*G11B 5/09*    (2006.01)

(52) U.S. Cl. ................. 369/47.4; 369/47.47; 369/47.36; 369/44.32

(58) Field of Classification Search ........................ None
See application file for complete search history.

(56) References Cited

U.S. PATENT DOCUMENTS

| 6,259,662 B1 * | 7/2001 | Matsui et al. | 369/47.48 |
| 6,952,387 B2 * | 10/2005 | Nishio et al. | 369/53.23 |
| 7,215,621 B2 * | 5/2007 | Takahashi | 369/53.2 |

FOREIGN PATENT DOCUMENTS

KR    2001-0036494    5/2001

* cited by examiner

*Primary Examiner*—Muhammad N. Edun
(74) *Attorney, Agent, or Firm*—Birch, Stewart, Kolasch & Birch, LLP

(57) ABSTRACT

A method and apparatus for controlling a maximum rotational speed of a recording medium, are discussed. The method according to an embodiment of the present invention includes determining an imbalance error of the recording medium, and variably setting a maximum rotational speed of the recording medium based on the determined imbalance error.

19 Claims, 4 Drawing Sheets

METHOD FOR CONTROLLING SPINDLE IN OPTICAL DISC DEVICE

This application claims the benefit of the Korean Patent Application No. 10-2005-0023257 filed on Mar. 21, 2005 in Republic of Korea, the entire contents of which are here by fully incorporated by reference.

BACKGROUND OF THE INVENTION

1. Field of the Invention

The present invention relates to a method for controlling a spindle in an optical disc device, and more particularly to a method and apparatus for controlling a maximum rotational speed of an optical disc based on an imbalance error of the optical disc.

2. Description of the Related Art

FIG. 1 is a block diagram of a general optical disc device. For example, a variety of types of optical disc devices such as DVD players may comprise an optical disc 10, an optical pickup 11, an RF processor 12, a digital signal processor 13, a spindle motor 14, a sled motor 15, a microcomputer 16, a motor drive 17, a servo controller 18, and a memory 19 as shown in FIG. 1. The components are operatively coupled.

The optical disc 10 may have a variety of structural errors which cause vibration and noise and exert adverse effects on a servo associated with playback and recording operations. Examples of such errors include an eccentric error caused by mismatch between the center of tracks formed on the optical disc and the center (i.e., a central hole) of the optical disc, and an imbalance error caused when the optical disc is bent asymmetrically in one direction from the center of the disc, e.g., due to the incorrect positioning of the optical disc on the optical disc device.

Generally the eccentric errors exert adverse effects on the servo over a range of low to high disc rotational speeds, almost regardless of the rotational speed of the optical disc. However, generally the imbalance errors exert no noticeable effect on the servo when the spindle motor 14 rotates the optical disc at a low speed while exerting an adverse effect on the servo when the optical disc rotates at a high speed. Thus, the eccentric and imbalance errors are different.

FIG. 2 is a flow chart of a method for controlling a spindle in an optical disc device according to a related art.

When an optical disc 10 is inserted into an optical disc device such as a DVD player, the microcomputer 16 controls the servo controller 18 to perform an operation for setting the maximum spindle/rotational speed of the disc 10.

The microcomputer 16 turns the spindle motor on to rotate the optical disc 10 and turns the focusing servo on while turning the tracking servo off (S10).

The microcomputer 16 rotates the spindle motor 14 at a preset low speed (for example, 3,000 RPM) (S11) and counts track cross signals detected by the optical pickup 11 while the optical disc 10 rotates once at the preset low speed (S12). The track cross signal count represents the number of tracks which a laser beam irradiated by the optical pickup 11 crosses, and corresponds to the eccentric error of the optical disc 10.

The microcomputer 16 compares the number of track crossings counted in the above manner with a first preset reference value (S13). If the track crossing count is equal to or exceeds the first reference value, the microcomputer 16 determines that the optical disc has a large eccentric error and sets the maximum spindle speed of the optical disc to a low spindle speed (for example, ×16) (S17).

On the other hand, if the track crossing count is less than the first reference value, the microcomputer 16 rotates the spindle motor 14 at a preset high speed (for example, 4,300 RPM) (S14) and counts track cross signals detected during one rotation of the optical disc 10 (S15). This track cross signal count corresponds to both the eccentric and imbalance errors of the optical disc 10.

The microcomputer 16 then compares the number of track crossings counted in the above manner with a second preset reference value (S16). If the track count is equal to or exceeds the second reference value, the microcomputer 16 determines that the optical disc has large eccentric and imbalance errors and sets the maximum spindle speed of the optical disc 10 to a low spindle speed (for example, ×16) (S17).

On the other hand, if the track crossing count is less than the second reference value, the microcomputer 16 determines that the optical disc 10 has small eccentric and imbalance errors which are within an acceptable range and thus sets the maximum spindle speed of the optical disc 10 at a high speed (for example, ×32) (S18).

The count of the track cross signals (track crossings) detected when the optical disc rotates at a high speed corresponds to the combination of eccentric and imbalance errors of the optical disc. Thus, for a given disc, if the imbalance error (which exerts an adverse effect only when the optical disc rotates at a high speed) is small and the eccentric error is relatively large, the error (i.e., mostly an eccentric error) detected when the optical disc rotates at a low speed may be larger than the first reference value, but at the same time, an error (i.e., the sum of eccentric and imbalance errors) detected when the optical disc rotates at a high speed is less than the second reference value. In this case, the related art method unnecessarily and unconditionally reduces the maximum spindle speed (S17) based on the eccentric error detected when the optical disc rotates at a low speed, even though the high speed test for the same disc indicates that the maximum spindle speed can and should be maintained.

SUMMARY OF THE INVENTION

Therefore, the present invention has been made in view of the above and other problems, and it is an object of the present invention to provide a method for adjusting the maximum spindle speed to an optimal level.

It is another object of the present invention to provide a method for detecting an imbalance (or unbalance) error of an optical disc, which affects a servo when the optical disc rotates at a high speed, and for adjusting the maximum spindle speed based on the detected imbalance error.

It is another object of the present invention to provide a method and apparatus for controlling a maximum rotational speed of a recording medium (e.g., an optical disc such as a DVD), which addresses the limitations and disadvantages associated with the related art.

In accordance with one aspect of the present invention, there is provided a method for controlling a maximum rotational speed of a recording medium, the method comprising: determining an imbalance error of the recording medium; and variably setting a maximum rotational speed of the recording medium based on the determined imbalance error.

In accordance with another aspect of the present invention, there is provided an apparatus for controlling a maximum rotational speed of a recording medium, the apparatus comprising: a controller to determine an imbalance error of the recording medium, and to variably set a maximum rotational speed of the recording medium based on the determined imbalance error.

The foregoing and other objects, features, aspects and advantages of the present invention will become more apparent from the following detailed description of the present invention when taken in conjunction with the accompanying drawings.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

The present invention is directed to a method for controlling a spindle in an optical disc device and the optical disc device. The preferred embodiments of the present invention will now be described in detail with reference to the accompanying drawings.

Figure 3:
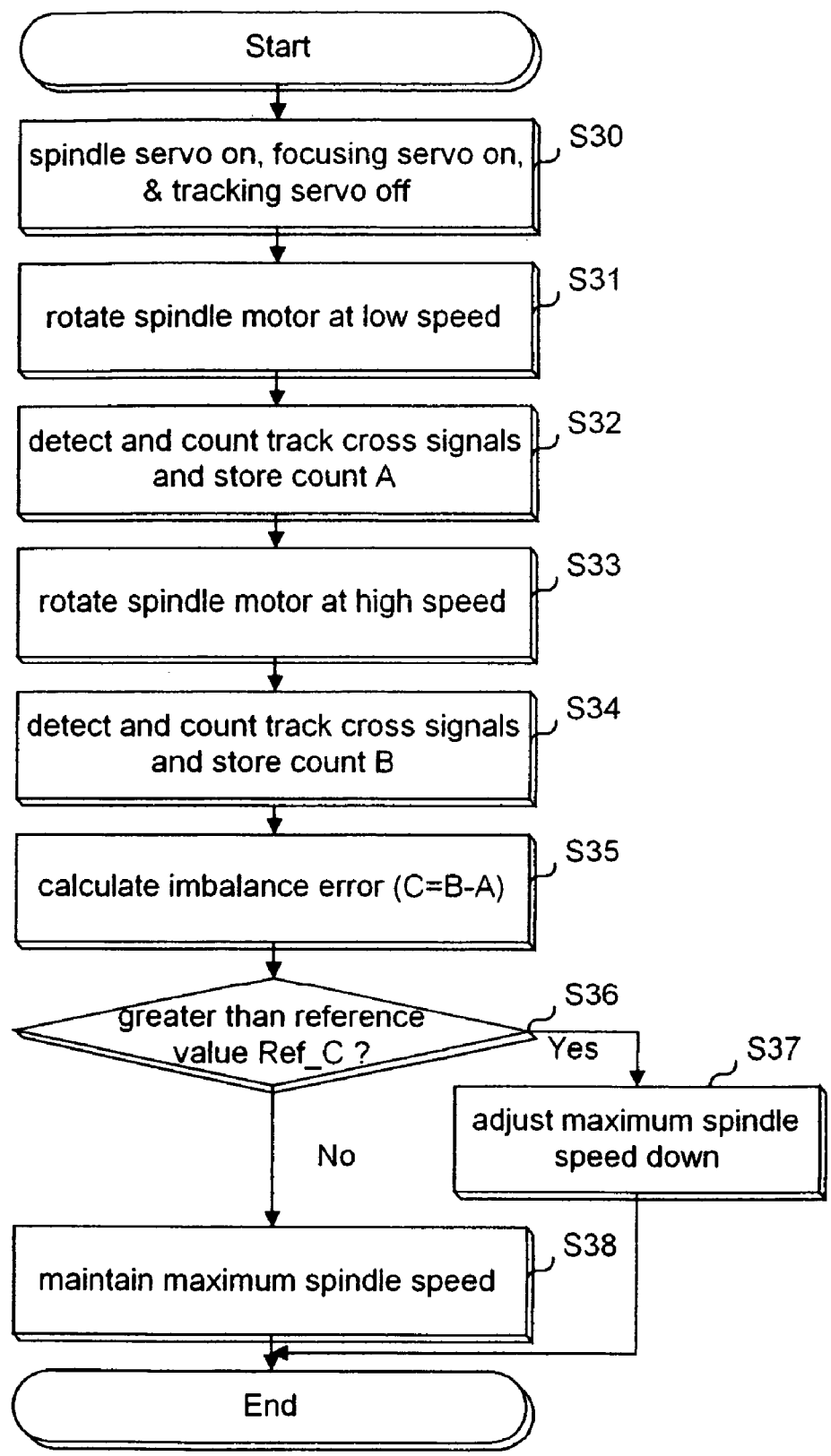
FIG. 3 is a flow chart illustrating a method for controlling a spindle in an optical disc device according to an embodiment of the present invention.
Figure 4:
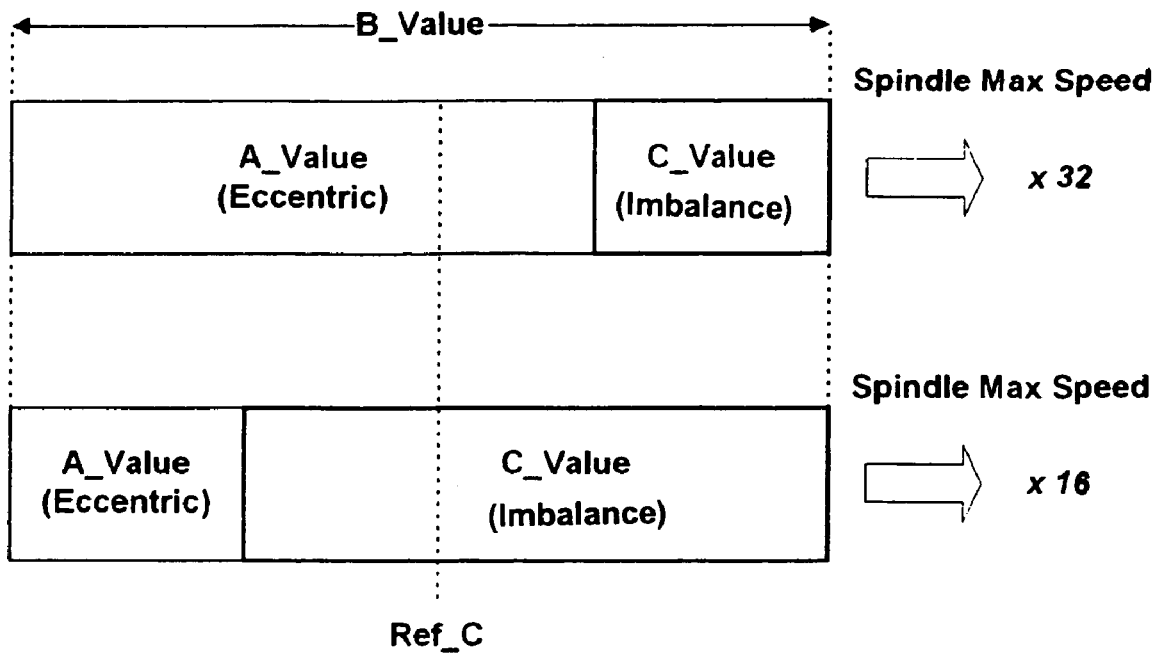
FIG. 4 illustrates an example of adjusting the maximum spindle speed according to an embodiment of the present invention.

FIG. 3 is a flow chart illustrating a method for controlling a spindle in an optical disc device according to an embodiment of the present invention. The method according to the present invention can be applied to the optical disc device constructed as described above with reference to FIG. 1, or to other apparatus/system. FIG. 4 also shows an example of a maximum spindle speed adjustment operation according to an embodiment of the present invention.

Figure 1:
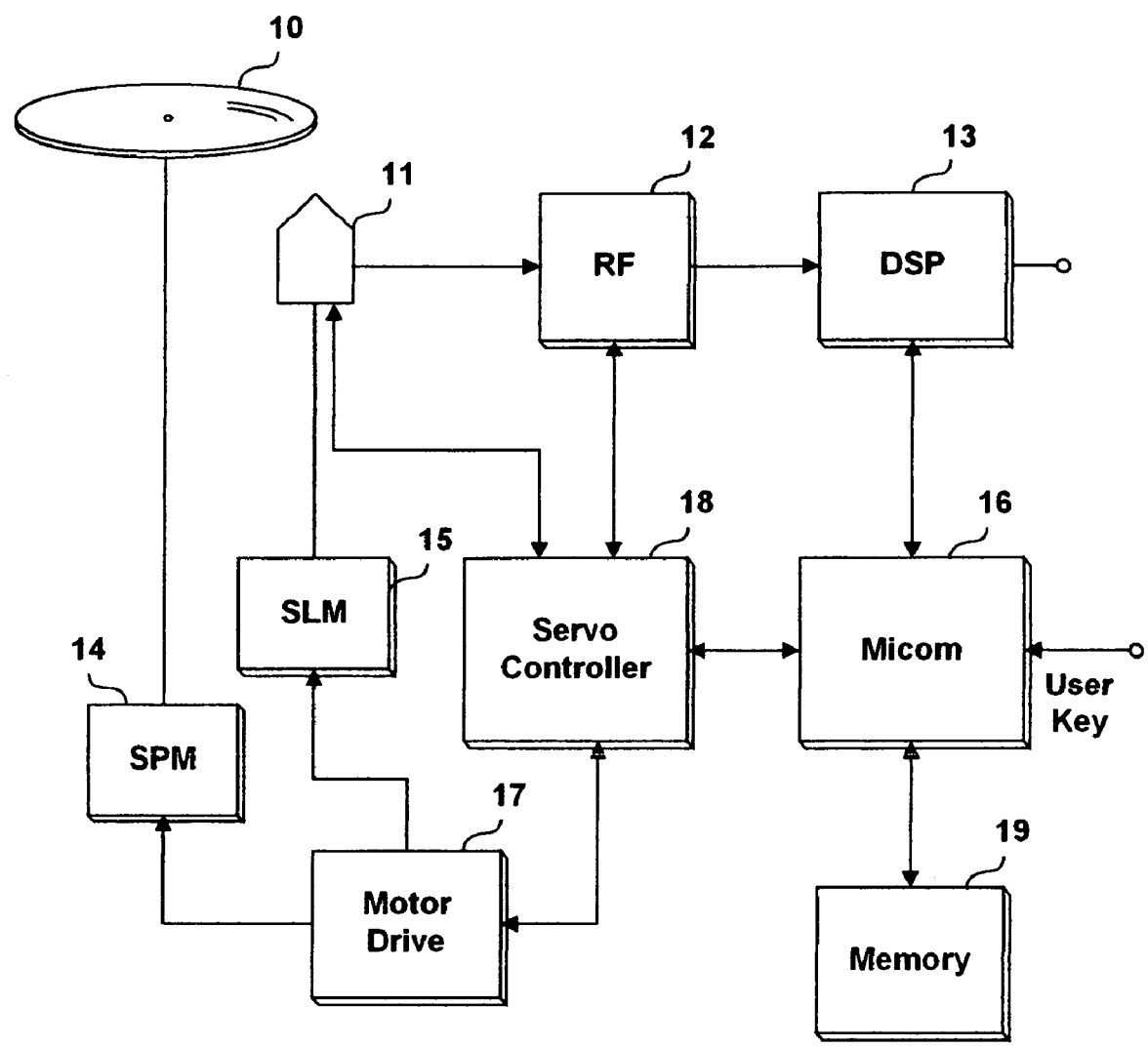
FIG. 1 is a block diagram of a general optical disc device in which the present invention can be applied.
Figure 2:
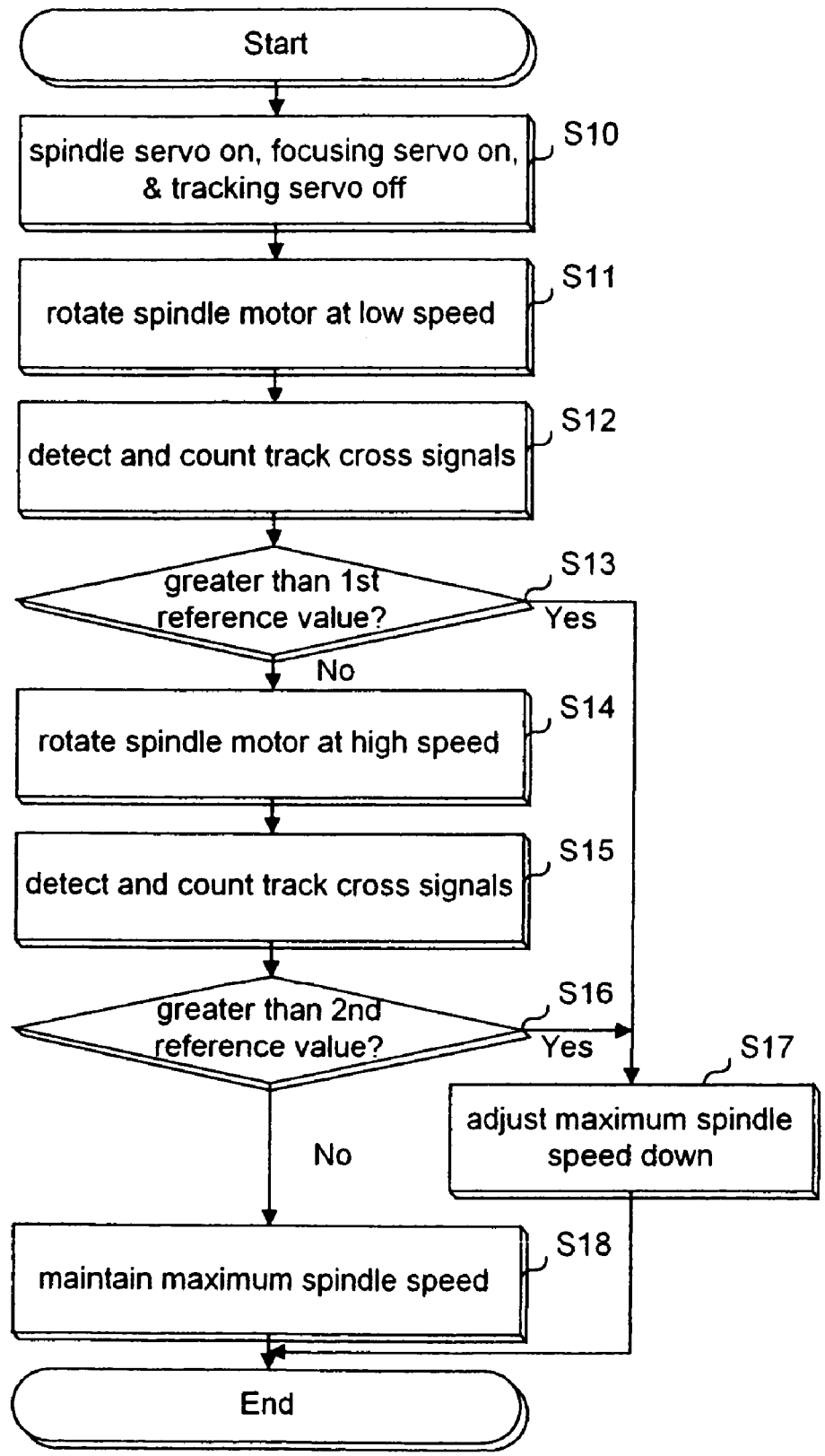
FIG. 2 is a flow chart illustrating a method for controlling a spindle in an optical disc device according to a related art.

Referring to FIGS. 1 and 3, if a recording medium such as an optical disc 10, e.g., a CD or DVD, is inserted into the optical disc device, the microcomputer 16 controls the servo controller 18 to perform a series of operations for setting a maximum spindle speed.

The microcomputer 16 turns the spindle motor 14 on to rotate the optical disc 10 and turns the focusing servo on while turning the tracking servo off (S30).

The microcomputer 16 rotates the spindle motor 14 at a preset low speed (for example, 3,000 RPM) (S31) and counts track cross signals detected by the optical pickup 11 during one rotation of the optical disc 10, and temporarily stores the track cross signal count as an eccentric error value A (S32). The track cross signal count represents the number of tracks which a laser beam irradiated by the optical pickup 11 crosses.

The amount of eccentricity may be detected based on the number of tracks which a laser beam irradiated by the optical pickup 11 crosses while the optical disc rotates half a turn. However, it is more desirable to detect the number of tracks which the laser beam crosses while the optical disc rotates one turn since an imbalance error to be detected is associated with an error of the optical disc when the optical disc is bent asymmetrically.

Thereafter, the microcomputer 16 rotates the spindle motor 14 at a preset high speed (for example, 4,300 RPM) (S33). The speed of 4,300 RPM is a rotational speed at which the imbalance error of the optical disc is detected remarkably well; however, other high speed may be used. This rotational speed can be set based on experimental results and can be changed to a different level.

The microcomputer 16 counts track cross signals detected by the optical pickup 11 while the optical disc 10 rotates once at the preset high speed and temporarily stores the track cross signal count as an eccentric and imbalance error value B (S34).

The microcomputer 16 then calculates an imbalance error value C by subtracting the stored eccentric error value A detected when the optical disc 10 rotates at the low speed at step S32 from the eccentric and imbalance error value B detected when the optical disc 10 rotates at the high speed at step S34 (i.e., C=B−A) (S35), and compares the imbalance error value C with a preset reference value Ref_C (S36). In the example of FIG. 4, the imbalance error value C_Value is obtained by subtracting the eccentric error value A_Value from the eccentric and imbalance error value B_Value.

When the result of the comparison indicates that the calculated imbalance error value C exceeds the reference value Ref_C (S36), the microcomputer 16 determines that the optical disc 10 has an imbalance error larger than the reference value and sets the maximum spindle speed to a preset level (for example, ×16 in FIG. 4) (S37). As a variation, if the calculated imbalance error value C exceeds the reference value Ref_C at step S36, the microcomputer 16 at step S37 may set the maximum spindle speed to a speed obtained by subtracting a value that is proportional to the difference (C−Ref_C) between the detected imbalance error value and the reference value from a maximum spindle speed supported by the optical disc device. That is, at step S37, the maximum spindle speed can be adjusted proportional to the difference (C−Ref_C). For instance, if the difference (C−Ref_C) is large, then the maximum spindle speed of the optical disc device can be lowered more, whereas if the difference is small, then the maximum spindle speed can be lowered less. This proportional adjustment can be done using a look-up table, which can provide the exact maximum spindle speed adjustment for each difference value, so as to provide an optimal maximum spindle speed adjustment operation.

On the other hand, if the calculated imbalance error value C does not exceed the reference value Ref_C at step S36, the microcomputer 16 determines that the current optical disc has an imbalance error less than the reference value and maintains the current maximum spindle speed supported by the optical disc device (for example, ×32 in FIG. 4) (S38).

As described above, the present invention calculates an imbalance error value, which causes a servo error only when the optical disc rotates at a high speed, and adjusts the maximum spindle speed based on the calculated imbalance error value. Accordingly, for example, even when an eccentric and imbalance error value B_Value of an optical disc having a small imbalance error C_Value is detected at the same level as that of an optical disc having a large imbalance error C_Value when they rotate at a high speed as shown in FIG. 4, the maximum spindle speed is prevented from being unnecessarily adjusted down when the optical disc has a small imbalance error or from being unconditionally adjusted down based only on the eccentric error value detected when the optical disc rotates at a low speed.

As is apparent from the above description, a method for controlling a spindle in an optical disc device according to the present invention easily and efficiently detects an imbalance error of an optical disc, adjusts the maximum spindle speed to be suitable for the imbalance error of the optical disc, and also minimizes vibration and noise caused by the imbalance error when the optical disc rotates at a high speed while preventing the maximum spindle speed from being unnecessarily adjusted down based on an eccentric error of the optical disc.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling a maximum rotational speed of a recording medium, the method comprising:
   determining an imbalance error of the recording medium; and
   variably setting a maximum rotational speed of the recording medium based on the determined imbalance error,
   wherein the determined imbalance error is calculated by subtracting a first track-related information detected at a first speed in a tracking servo off state from a second track-related information detected at a second speed in the tracking servo off state.

2. The method according to claim 1, wherein in the variably setting step, the maximum rotational speed of the recording medium is set based on only the determined imbalance error.

3. The method according to claim 1, wherein in the variably setting step, the maximum rotational speed of the recording medium is set based on the determined imbalance error without relying on an eccentric error of the recording medium.

4. The method according to claim 1, wherein the determining step includes:
   detecting track-related information of the recording medium rotated at different speeds.

5. The method according to claim 4, wherein for each of the different speeds, the track-related information is the number of track crossings detected while the recording medium rotates once.

6. The method according to claim 1, wherein the first speed is lower than the second speed.

7. The method according to claim 1, wherein, if the determined imbalance error is equal to or larger than a predetermined reference, the setting step sets the maximum rotational speed of the recording medium to a predetermined speed lower than a maximum speed supported by an optical disc device.

8. The method according to claim 1, wherein, if the determined imbalance error is equal to or larger than a predetermined reference, the setting step sets the maximum rotational speed of the recording medium proportional to a difference between the determined imbalance error and a predetermined reference.

9. The method according to claim 1, wherein in the determining step, the recording medium is an optical disc.

10. An apparatus for controlling a maximum rotational speed of a recording medium, the apparatus comprising:
    a controller to determine an imbalance error of the recording medium, and to variably set a maximum rotational speed of the recording medium based on the determined imbalance error,
    wherein the determined imbalance error is calculated by subtracting a first track-related information detected at a first speed in a tracking servo off state from a second track-related information detected at a second speed in the tracking servo off state.

11. The apparatus according to claim 10, wherein the apparatus is an optical recording/reproducing device.

12. The apparatus according to claim 10, wherein the maximum rotational speed of the recording medium is set based on only the determined imbalance error.

13. The apparatus according to claim 10, wherein the maximum rotational speed of the recording medium is set based on the determined imbalance error without relying on an eccentric error of the recording medium.

14. The apparatus according to claim 10, wherein the controller determines the imbalance error by detecting track-related information of the recording medium rotated at different speeds.

15. The apparatus according to claim 14, wherein for each of the different speeds, the track-related information is the number of track crossings detected while the recording medium rotates once.

16. The apparatus according to claim 10, wherein the first speed is lower than the second speed.

17. The apparatus according to claim 10, wherein, if the determined imbalance error is equal to or larger than a predetermined reference, the controller sets the maximum rotational speed of the recording medium to a predetermined speed lower than a maximum speed supported by the apparatus.

18. The apparatus according to claim 10, wherein, if the determined imbalance error is equal to or larger than a predetermined reference, the controller sets the maximum rotational speed of the recording medium proportional to a difference between the determined imbalance error and a predetermined reference.

19. The apparatus according to claim 10, wherein the recording medium is an optical disc.

* * * * *